United States Patent [19]  [11] Patent Number: 4,856,381
Funahashi et al.  [45] Date of Patent: Aug. 15, 1989

[54] FLUID PRESSURE CONTROL SYSTEM FOR AUTOMATIC TRANSMISSION

[75] Inventors: Makoto Funahashi; Seitoku Kubo, both of Toyota; Shinya Nakamura, Owariasahi, all of Japan

[73] Assignee: Toyota Jidosha Kabushiki Kaisha, Japan

[21] Appl. No.: 180,762

[22] Filed: Apr. 12, 1988

[30] Foreign Application Priority Data

Apr. 17, 1987 [JP] Japan .................................. 62-94647

[51] Int. Cl.⁴ ............................................ F16H 41/16
[52] U.S. Cl. ..................................................... 74/867
[58] Field of Search .................................. 74/867, 868

[56] References Cited

U.S. PATENT DOCUMENTS 4,428,258  1/1984  Kubo et al. ............................ 74/867
4,709,597  12/1987  Yasue et al. ........................... 74/868
4,722,250  2/1988  Sumiya et al. ........................ 74/867

FOREIGN PATENT DOCUMENTS 58-152961  9/1983  Japan .
61-130653  6/1986  Japan .
61-149657  7/1986  Japan .

OTHER PUBLICATIONS

"Toyota Corona FF", (1985-8).

Primary Examiner—Dirk Wright
Attorney, Agent, or Firm—Oliff & Berridge

[57] ABSTRACT

Herein disclosed is a fluid pressure control system which is to be used in an automatic transmission for automobiles. If a reverse range is selected by selector means such as a manual valve, a fluid pressure is fed via an accumulator to friction engaging means for setting the reverse range, and a signal pressure is fed to back pressure regulating means which is constructed of a spool valve. This back pressure regulating means responds to the signal pressure to reduce a load against the fluid pressure to be fed to the friction engaging means. Thus, the fluid pressure to be fed to the friction engaging means via the accumulator drops when the signal pressure is fed. In the reverse range, specifically, the fluid pressure to be fed to the friction engaging means transmits at a lower level to elongate the time period for the engagement so that the gear shift shock for the reverse range is accordingly reduced.

6 Claims, 2 Drawing Sheets

FLUID PRESSURE CONTROL SYSTEM FOR AUTOMATIC TRANSMISSION

BACKGROUND OF THE INVENTION

The present invention relates to a fluid pressure control system for controlling the various speed stages of an automatic transmission for a vehicle such as an automobile and, more particularly, to a fluid pressure control system for regulating the back pressure of an accumulator.

As is well known in the relevant art, the vehicular automatic transmission uses a gear mechanism such as a planetary gear set composed of three elements, two of which are used for an input and an output with the remaining one being fixed. With this construction, speed stages or ranges such as gear ratios including reverse and plural forward stages are set by switching the fixed and meshing states of those gear elements through friction engaging means such as a clutch and a brake. The engagement and release of the friction engaging means are controlled by fluid pressures. The vehicular automatic transmission of this type is disclosed in various references such as Japanese Patent KOKAI No. 61-149657 directed to a gear train or "Manual of New Car — Toyota Corona FF" (issued by Toyota Jidosha Kogyo Kabushiki Kaisha) directed to a gear train including a fluid pressure control circuit.

In the automatic transmission, as is disclosed in these references and known in the art, transmissions of torques in the individual speed stages are effected through friction engaging means so that the load to be exerted upon the engaging means highly differs in dependence upon a throttle opening and a vehicular running speed. This makes it necessary to reduce the gear shift shock by regulating either the pressure of a working fluid to be exerted upon the friction engaging means in accordance with the throttle opening or the back pressure of an accumulator which is disposed midway of a fluid passage leading to the friction engaging means, thus maintaining the durability of this means.

In the invention disclosed in the above-specified Japanese Patent KOKAI No. 61-149657, for example, a computer-controlled back pressure regulator (e.g., a duty valve) is provided for processing various pieces of information such as the throttle opening, the running speed or the kinds of speed stages to send signals to the back pressure regulator so that the back pressure of the accumulator may be suited for all the speed stages and the vehicles.

In the invention disclose in Japanese Patent KOKAI No. 58-152961, on the other hand, noting that the fluid pressures for completing the engagement of the friction engaging means for high- and low-idling operations are different, the accumulator back pressure is boosted for the high-idling operation to reduce the gear shift shock which the speed stage is manually shifted from the neutral range to the drive or reverse range.

Moreover, the invention disclosed in the specification of U.S. Pat. No. 4,428,258 notes that the engine output torque is remarkably low for a small throttle opening and gently rises for a large throttle opening so that it is not linearly proportional to the throttle opening. Control is made to drop the fluid pressure for engaging the friction engaging means for the large and small throttle openings.

In Japanese Patent KOKAI No. 61-130653, still moreover, there is disclosed a system which is operative to detect the magnitudes of the causes of the gear shift shock in terms of the throttle opening and has a control valve for controlling the accumulator back pressure in accordance with those magnitudes.

Here, the switching of the gear ratios by the gear transmission mechanism of the automatic transmission is performed by engaging or disengaging a plurality of friction engaging means. Of these, some means is engaged at a plurality of gear ratios. For example, the direct clutch (or $C_2$ clutch), as is disclosed in the above-specified Japanese Patent KOKAI No. 61-149657 or "Manual of New Car —Corona FF", is engaged in the two cases in which the manual valve is set in the reverse (R) stage and in which a third or higher speed stage is set in accordance with the throttle opening and the vehicular running speed. The accumulator belonging to such friction engaging means of dual stage type is generally tuned in the prior art to the characteristics required for shifting up the speed stage from 2nd to 3rd, taking preference of avoiding the gear shift shock while the vehicle is running. In other words, the back pressure of the accumulator, the area of the back pressure or the strength of a spring is adjusted to become suitable for the upshift to the 3rd speed. For the shift to the reverse range, however, the aforementioned tuning will make the timing premature for the engagement of the direct clutch, thus causing the disadvantage of the gear shift shock.

On the contrary, the aforementioned control for dropping the working fluid pressure with a small throttle opening (as is disclosed in the specification of U.S. Pat. No. 4,428,258) is accomplished with reference to the throttle opening but not the difference between the selection of the reverse range and the upshift to the 3rd speed. This makes it difficult to eliminate the aforementioned gear shift shock at the instant when the reverse range is set.

In the control of raising the accumulator back pressure in a high-idling operation (as is disclosed in Japanese Patent KOKAI No. 58-152961), on the other hand, the accumulator back pressure in a low-idling operation is made different from that in the high-idling operation. In the case of the reverse range, however, it is the current practice to boost the accumulator back pressure so as to increase the engaging force of the friction engaging means such as the clutch because the torque to be transmitted by that means is high. If the reverse range is to be established in the low-idling operation, the accumulator back pressure is boosted to a higher level than that of the case in which the gear is shifted to another speed stage. As a result, the method disclosed in the Japanese patent KOKAI No. 58-152961 is accompanied by the gear shift shock because the engaging timing of the friction engaging means for the setting of the reverse range is premature.

On the other hand, the system (as is disclosed in the Japanese Patent KOKAI No. 61-149657) controls the accumulator back pressure for all the conditions by means of its computer. In the reverse range, the system boosts up the accumulator back pressure as the torque to be transmitted is high, so that it cannot always reduce the shock upon shifting to reverse without fail. In addition, this system is troubled by other problems of complicated construction or high production cost, which are caused by adding electric devices such as a computer or an electromagnetic valve.

On the other hand, the control system disclosed in the Japanese Patent KOKAI No. 61-130653 is one controlling the accumulator back pressure in accordance with the magnitudes of the causes for the gear shift shock such as the throttle opening. In case the reverse range is to be set, the fluid pressure for engaging the clutch for the reverse and forward ranges is throttled by means of an orifice to slowly raise the fluid pressure. This equalizes the rises in the fluid pressure for setting the 3rd forward and reverse ranges. As a result, the rising characteristics of the fluid pressure have to be tuned suitably for setting either the 3rd speed or the reverse range. As a result, the tuning becomes unsuitable for either of the settings, followed by the gear shift shock.

As has been described above, the prior art is troubled by the serious problem that the gear shift shock is higher upon shifting to reverse than upon shifting to each of the forward speed stages, because the accumulator back pressure for reverse is either as high as or positively higher than that for the 3rd forward stage, for example. If, on the other hand, the accumulator back pressure is dropped to reduce the gear shift shock for reverse, there arises another problem that the shock for the 3rd forward speed stage is increased.

SUMMARY OF THE INVENTION

The present invention has been conceived in view of the background thus far described and has a major object to provide a fluid pressure control system which can effectively eliminate the gear shift shock when the speed range is shifted to reverse.

Another object of the present invention is to provide a fluid pressure control system which is enabled to reduce the shock upon gear shifting to reverse by using a simple construction without electric means such as a computer or a solenoid valve.

In order to achieve these objects, the system of the present invention is characterized in that, when the reverse range is selected, a signal pressure is established in accordance with the selection to actuate back pressure regulating means thereby to drop the back pressure of an accumulator, which accompanies friction engaging means for engagements at reverse and another speed stage. According to the system of the present invention, if the reverse range is selected by selector means, the signal pressure is fed to the back pressure regulating means so that the back pressure of the accumulator drops. In accordance with this drop, the fluid pressure to be fed to the friction engaging means through the accumulator transmits at a low level to elongate the time period required for the engagement. After the friction engaging means has been engaged, namely, after the operation of the accumulator, the fluid pressure acting upon the friction engaging means takes on a predetermined level necessary for setting the reverse range. In case a speed range other than reverse is selected by the selector means, on the other hand, no signal pressure is fed to the back pressure regulating means so that the back pressure of the accumulator does prevent drop so much. This will not transmission of a low level of fluid pressure to the friction engaging means. In short, according to the present invention, the back pressure of the accumulator drops only when the reverse range is selected, so that the shock upon shifting to reverse will not increase even if the accumulator is tuned to a speed range other than reverse.

The system of the present invention may employ as the back pressure regulating means a spool valve for regulating the pressure by the urging force of a spring. In this construction, this spring force is enabled to match the signal pressure. In order that a load matching the spring may be established by the signal pressure, moreover, two lands to be exposed to the signal pressure may have different face areas.

Other objects and advantages of the present invention will be easily understood from the following description.

DETAILED DESCRIPTION OF THE PREFERRED EMBODIMENT

Figure 1:
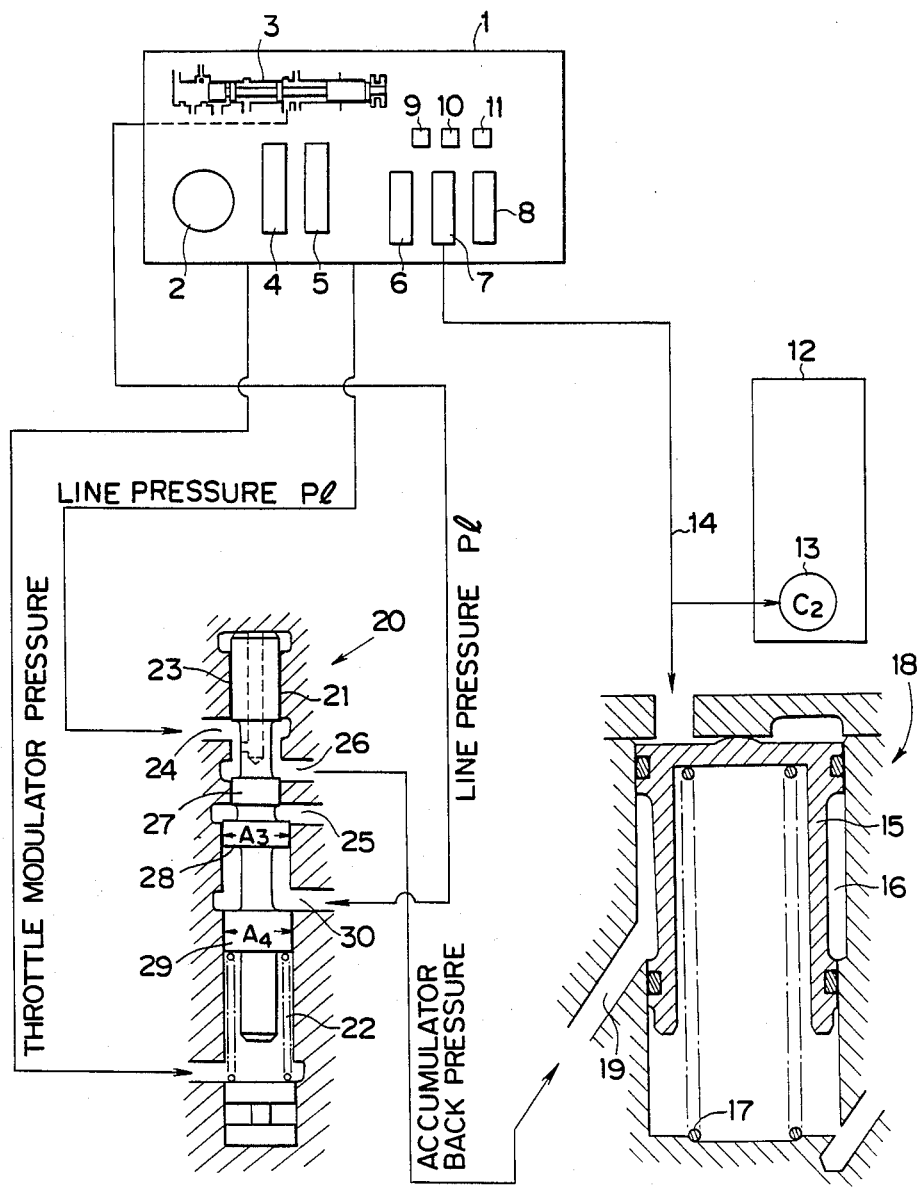
FIG. 1 is a schematic circuit diagram showing one embodiment of the present invention.

In FIG. 1, a fluid pressure control circuit, as designated at reference numeral 1, has an ordinary construction known in the art. This control circuit 1 is constructed of an oil pump 2, a manual valve 3 acting as selector means, a line pressure control valve 4 and a throttle pressure control valve 5. The line pressure control valve 4 is one for regulating the fluid pressure produced by the oil pump 2 to a line pressure according to a throttle pressure and a line pressure for the reverse range. The manual valve 3 is provided for setting the speed ranges such as stop, reverse, neutral and forward stages and feeds the line pressure to a predetermined fluid passage in accordance with each of the ranges set. The throttle pressure control valve 5 is one for producing the throttle pressure substantially proportional to a throttle opening. Further inclusive in the fluid pressure control circuit 1 are a 1–2 shift valve 6, a 2–3 shift valve 7 and a 3–4 shift valve 8. These shift valves 6, 7 and 8 are made operative, in response to signal pressures coming from first to third solenoid valves 9, 10 and 11 to be driven in accordance with various pieces of information such as the vehicular running speed or the throttle opening, to either feed the working fluid pressure to suitable friction engaging means in a gear train mechanism 12 or interrupt the feed of the fluid pressure thereby to set the speed stages of the gear transmission mechanism 12.

This construction is widely known as the fluid pressure circuit of an electronic control type automatic transmission. The gear transmission mechanism 12 includes a direct ($C_2$) clutch 13 which is to be engaged when it is fed with the working fluid pressure through the 2–3 shift valve 7 of the fluid pressure control circuit 1. This control circuit 1 is made operative to feed the working fluid pressure to the $C_2$ clutch 13 in case the reverse stage is set by the manual valve 3 and in case the 3rd forward stage is set in accordance with the vehicular running speed and the throttle opening. Midway of a fluid passage 14 leading to the $C_2$ clutch 13, there is disposed an accumulator 18 which has a piston 15 fitted in a cylinder 16 and urged in a predetermined direction by the action of a spring 17. The accumulator 18 has its back pressure port 19 connected to an accumulator regulating valve 20 acting as back pressure regulating means.

The fundamental function of this accumulator regulating valve 20 is to reduce the gear shift shock by dropping the accumulator back pressure in the vicinity of a small throttle opening. For this function, a throttle modulator pressure, which is prepared by modulating the throttle pressure, is applied to a chamber in which is fitted a spring 22 for urging a spool 21 in one direction. On the other hand, a line pressure $P_1$, which is obtained by the line pressure control valve 4, is applied to an inlet port 24 which is opened or closed by a first land 23 formed on the spool 21 at the opposite side to the spring 22. Moreover, an outlet port 26 opens between the inlet port 24 and a drain port 25 and communicates with the aforementioned back pressure port 19. The communication of that outlet port 26 with the inlet port 24 and the drain port 25 is selectively established by the first land 23 and a second land 27. Still moreover, the portion of the spool 21 below (as seen from FIG. 1) the second land 27 is formed with third and fourth lands 28 and 29. These lands 28 and 29 have their face areas set such that the face area $A_4$ of the fourth land 29 is slightly larger than the face area that $A_3$ of the third land 28 (i.e., $A_3 < A_4$) A signal port 30 opens between those third and fourth lands 28 and 29. This signal port 30 is made operative to produce the line pressure $P_1$ for the reverse range and is caused to communicate with the line pressure passage through the manual valve 3 by setting this valve 3 in the reverse stage.

Next, the operations of the fluid pressure control system thus constructed according to the present invention will be described in the following.

Figure 2:
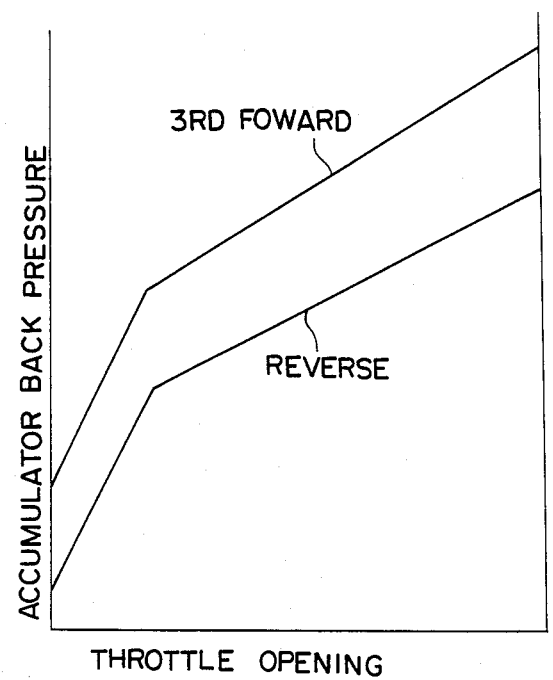
FIG. 2 is a graph plotting the variations of the accumulator back pressure in the cases of the 3rd forward and reverse speed stages.

If the vehicular running speed increases with the manual valve 3 being set in the drive range so that the 2-3 shift valve 7 is accordingly shifted to the 3rd forward stage, the working fluid pressure (i.e., the line pressure $P_l$) is fed via the fluid passage 14 to not only the $C_2$ clutch 13 but also the accumulator 18. Since, at this time, the accumulator regulating valve 20 does not receive any special fluid pressure at its signal pressure port 30, its spool 21 is raised to the upper end (as seen from FIG. 1) by the actions of the spring 22 and the throttle modulator pressure. As a result, a fluid pressure $P_3$ according to the spring force and the throttle modulator pressure is established in the outlet port 26 of the accumulator regulating valve 20 to exert the back pressure upon the accumulator 28. This boosts up the accumulator back pressure in accordance with the load applied to the $C_2$ clutch 13, as plotted in FIG. 2, so that the engagement timing of the $C_2$ clutch 13 is optimized to prevent the gear shift shock and its abnormal wear.

If, on the contrary, the manual valve 3 is set in the reverse range, the working fluid pressure is likewise fed to the $C_2$ clutch 13 via the fluid passage 14. Simultaneously with this, the line pressure is applied to the signal pressure port 30 of the accumulator regulating valve 20. Since the face area $A_3$ of the third land of the spool 21 is slightly smaller than the face area $A_4$ of the fourth land 29, a downward force is applied to the spool 21 to reduce the raising force of the spool 21 so that a fluid pressure $P_r$ lower than the aforementioned fluid pressure $P_3$ (i.e., $P_r < P_3$) is established in the outlet port 26 to act as the back pressure upon the accumulator 18. In other words, the setting of the reverse range is usually effected for a smaller throttle opening so that the accumulator back pressure is dropped according to the low load upon the $C_2$ clutch 13, as plotted in FIG. 2, to eliminate the gear shift shock which might otherwise be caused upon the gear change to reverse.

The present invention exhibits an especially prominent effect as a system for controlling the back pressure of the accumulator for the $C_2$ clutch which is to be applied in the cases of the reverse range and the 3rd or higher forward range. Hence, the present invention should not be limited to the aforementioned embodiment in which the accumulator is used for controlling the $C_2$ clutch, but can be applied to the case in which the back pressure of the accumulator is controlled for another friction engaging means of the vehicular automatic transmission. Moreover, the back pressure control means should not be limited to the construction specified in the embodiment but may have any construction if the accumulator back pressure can be dropped in the reverse stage.

As is apparent from the description thus far made, according to the fluid pressure control system of the present invention, the back pressure of the accumulator for the friction engaging means to be engaged in the gear shift to reverse and a predetermined forward range can be dropped in the former reverse shift. As a result, the gear shift shock, which has been inevitably caused with a view to preferring the elimination of the shift shock during the running operation, can be effectively reduced to provide an automatic transmission which can ensure comfortable drive.

What is claimed is:

1. In an automatic transmission including selector means for selecting a plurality of speed stages including reverse, neutral and forward stages; at least one shift valve made operative in response to a first signal pressure coming from said selector means and a second signal pressure according to a vehicular running speed and a throttle opening; friction engaging means adapted to come into engagement in response to a fluid pressure coming from said shift valve in case the reverse stage is selected by said selector means and in case the running speed and the throttle opening come into a state for shifting a predetermined forward speed stage to another; and an accumulator disposed midway of a fluid passage leading from said shift valve to said friction engaging means for establishing a back pressure against the fluid pressure prevailing in said fluid passage, a fluid pressure control system comprising back pressure regulating means having a port for receiving the first signal pressure, when the reverse stage is selected by said selector means, for dropping the back pressure of said accumulator when the first signal pressure is exerted upon said port.

2. A fluid pressure control system according to claim 1, wherein said back pressure regulating means comprises: an inlet port for receiving a line pressure; an outlet port for feeding the back pressure to said accumulator; a signal pressure port for receiving the first signal pressure when the reverse stage is selected by said selector means; a drain port; a spool having a land for switching communication of said outlet port with said inlet port and said drain port; and a spring for urging said spool against the pushing force of the line pressure, whereby the first signal pressure fed to said signal pressure port pushes said spool in a direction to compress said spring.

3. A fluid pressure control system according to claim 2, wherein said spool further has two lands for receiving the signal pressure, one of which is positioned closer to said spring than the other and has a larger face area than that of the other.

4. A fluid pressure control system according to claim 1, wherein said selector means is a manually operated valve, and wherein the first signal pressure is a line pressure to be fed through said manual valve when said manual valve is set in said reverse stage.

5. A fluid pressure control system according to claim 2, wherein said back pressure regulating means is made operative to apply both a throttle modulator pressure, which is substantially proportional to the throttle opening, to said spool in the same direction as that of the urging force of said spring and the first signal pressure to said spool in a direction opposed to that of the throttle modulator pressure.

6. A fluid pressure control system according to claim 1, wherein said friction engaging means is a clutch which is to be engaged in a forward speed stage not lower than third and in the reverse stage.

* * * * *